US006488851B1

(12) United States Patent
Almog

(10) Patent No.: US 6,488,851 B1
(45) Date of Patent: Dec. 3, 2002

(54) REACTOR AND PROCESS FOR BIOLOGICALLY TREATING SEWAGE

(75) Inventor: Ehud Almog, Ramat Hasharon (IL)

(73) Assignee: Projects, Ltd., Ramat Hasharon (IL)

( * ) Notice: Subject to any disclaimer, the term of this patent is extended or adjusted under 35 U.S.C. 154(b) by 0 days.

(21) Appl. No.: 09/856,205

(22) PCT Filed: Nov. 19, 1999

(86) PCT No.: PCT/IL99/00624
§ 371 (c)(1),
(2), (4) Date: Jul. 2, 2001

(87) PCT Pub. No.: WO00/30984
PCT Pub. Date: Jun. 2, 2000

(30) Foreign Application Priority Data

Nov. 20, 1998 (IL) ................................................ 127174

(51) Int. Cl.[7] ................................................. C02F 3/00
(52) U.S. Cl. ......................... 210/605; 210/630; 210/255
(58) Field of Search ............................... 210/605, 630, 210/255

(56) References Cited

U.S. PATENT DOCUMENTS

| 3,054,602 | A | * | 9/1962 | Proudman .................... 210/201 |
| 3,945,918 | A | | 3/1976 | Kirk |
| 3,994,802 | A | | 11/1976 | Casey et al. |
| 4,267,038 | A | * | 5/1981 | Thompson .................... 210/151 |
| 4,279,753 | A | | 7/1981 | Nielson et al. |
| 4,374,730 | A | | 2/1983 | Braha et al. |
| 4,564,457 | A | | 1/1986 | Cairo, Jr. et al. |
| 5,049,662 | A | | 9/1991 | Steeg et al. |
| 5,080,793 | A | * | 1/1992 | Urlings ........................ 210/150 |
| 5,500,412 | A | | 3/1996 | Carney et al. |
| 5,516,889 | A | | 5/1996 | Hollenberg et al. |
| 5,725,770 | A | * | 3/1998 | Henry .......................... 210/180 |
| 6,139,745 | A | * | 10/2000 | Mizumori et al. ........... 210/143 |

FOREIGN PATENT DOCUMENTS

| WO | WO 90/11254 | 10/1990 |
| WO | WO 98/55407 | 12/1998 |

OTHER PUBLICATIONS

*Tumor Cells Express Functional "Tethered Ligand" Thrombin Receptor*, Wojtukiewicz et al., Cancer Research 55:698–704, Issue 3, 1995.
*Enhancement of the Expression of Urokinase–Type Plasminogen Activator from PC–3 Human Prostate Cancer Cells by Thrombin*, Yoshida et al., Cancer Research, 54: 3300–3304, Jun. 15, 1994.

(List continued on next page.)

Primary Examiner—Chester T. Barry
(74) Attorney, Agent, or Firm—Greer, Burns & Crain, Ltd.

(57) ABSTRACT

The present invention provides a reactor and process for the biological treatment of sewage, being transferred, by gravitational forces with a substantially constant flow rate (Q), through an array of successively alternating aerobic and anaerobic compartments (14, 16) for, respectively, aerobic and anaerobic degradation of biodegradable substances in said sewage, the compartments, which form part of the reactor of the invention, are separated by partition walls (50) and each has a top area (S), the passage of the sewage from an aerobic compartment (16) to its adjacent succeeding anaerobic compartment (14) is provided at the bottom of their common partition wall, while the transfer of sewage from an anaerobic compartment to its adjacent aerobic compartment is performed by means of gravity-caused flow over their common partition wall, whereby oxygen required for the aerobic treatment is dissolved into the sewage via an air-sewage interface at the top area of the anaerobic and aerobic compartments forming thereby a dissolution layer, the depth of oxygen dissolution and, consequently, the oxygen concentration in the dissolution layer at the top area of the compartments being defined by the vertical velocity of the liquid within the compartments, calculates as $V=Q/S$.

22 Claims, 8 Drawing Sheets

OTHER PUBLICATIONS

*Agonist Receptors and G Proteins as Mediators of Platelet Activation*, Brass et al., Mechanisms of Platlet Activation and Control, Edited by K.S. Authi et al., Plenum Press, New York, 17–36, 1993.

*Tissue Factor–initiated Thrombin Generation Activates the Signaling Thrombin Receptor on Malignant Melanoma Cells*, Fischer et al., Cancer Research, 55, 1629–1632, Apr. 15, 1995.

*The Role of Thrombin in Tumor Cell Metastasis*, Walz et al., Invasion Metastasis, 14:303–308, 1994–95.

*Molecular Cloning of a Functional Thrombin Receptor Reveals a Novel Proteolytic Mechanism of Receptor Activation*, Vu et al., Cell, 64: 1057–1068, Mar. 22, 1991.

*Her–2/neu Expression in Node–negative Breast Cancer: Direct Tissue Quantitation by Computerized Image Analysis and Association of Over Expression with Increased Risk of Recurrent Disease*, Press et al., Cancer Research, 53: 4960–4970, Oct. 15, 1993.

*Binding and Degradation of Hyaluronan by Human Breast Cancer Cell Lines Expressing Different Forms of CD44: Correlation With Invasive Potential*, Culty et al., Journal of Cellular Physiology 160:275–286, 1994.

*Association of Increased Basement Membrane Invasiveness With Absence of Estrogen Receptor and Expression of Vimentin in Human Breast Cancer Cell Lines*, Thompson et al., Journal of Cellular Physiology, 150: 534–544, 1992.

*Studies of the HER–2/neu Proto–oncogene in Human Breast and Ovarian Cancer*, Slamon et al., Science Reports, 707–712, May 12, 1989.

*Biological Nutrient Removal Without the Addition of Chemicals*, James L. Barnard, Water Research 9:485–490, 1975.

*Nitrogen Elimination By Rapid Alternation of Aerobic/"Anoxic" Conditions in "Orbal" Activation Sludge Plants*, Drews et al., Water Research 7:1183–1194, 1973.

* cited by examiner

REACTOR AND PROCESS FOR BIOLOGICALLY TREATING SEWAGE

FIELD OF THE INVENTION

The present invention relates in general to a biological treatment of wastewater, e.g. sewage.

BACKGROUND OF THE INVENTION

The treatment of wastewater, whether for purposes of recycling or prior to its discharge into treatment works, rivers, lakes, groundwater suppliers, etc., is an ever-increasing problem. To date, three general classes of methods for removing contaminating organic substances from wastewater, such as sewage, have been developed. These are chemical treatments, biological treatments, and physical treatments.

Chemical treatment generally involves the introduction of a strong oxidizing agent, such as ozone, chloride dioxide and hydrogen peroxide, into the wastewater stream, whereby the contaminating organic substances within the wastewater are partially or fully oxidized to carbon dioxide and water. Whilst in some instances, such chemical purification may be desirable, it often may pose problems. First, hazardous chemical agents are required during the treatment. Secondly, such agents may be relatively expensive. Thirdly, on a large scale, oxidation processes may be rather slow, unless the oxidant is used in very large amounts.

Physical treatment includes, for example, carbon adsorption and air stripping. Though such methods are effective for some applications, they are non-destructive of toxic organic contaminants. Thus, disposal problems of such toxic organic contaminants remain.

Biological treatments have been used in a wide variety of applications. Generally, the treatment involves contacting wastewater with a consortium (community) of microorganisms that utilize dissolved organic substances as nutrients. During the biological treatment, three main activities occur: reduction of biological oxygen demand (B.O.D reduction), nitrification and denitrification of the organic waste. All three processes are affected by bacteria, the former two—by aerobic bacteria, and the latter—by anaerobic (anoxic) bacteria.

In the various reactors for biological treatment of sewage, mutual disposition of the biological activities in the overall treatment may be different in that the denitrification stage may be performed before, concurrently or after B.O.D. reduction.

When denitrification is performed before B.O.D. reduction and nitrification, this may take place either in a separate reactor or in the area of the main reactor where the is raw sewage enters. When denitrification is performed after B.O.D. reduction and nitrification, the system typically requires its supplementation with an additional source of carbon, such as methanol, in order to effect denitrification. When denitrification, B.O.D. reduction and nitrification occur concurrently, in a so called combined system, this system typically comprises alternating aerobic and anaerobic stages in which incremental reduction in the organic carbon and nitrogen content of the sewage is accomplished in each stage. This enables the system to maintain the organic carbon after the B.O.D. reduction stages at a sufficient level for denitrification without adding an additional source of carbon. Systems of this type are disclosed, for example, in U.S. Pat. Nos. 3,994,802; 3,945,918; 4,279,753; 4,564,457 and 4,374,730, in Barnard J. L. Water Research 9:485–490 (1975) and in Drews J. L. C. et al. Water Research 7:1183–1194 (1973).

Typically, the combined systems for biological treatment of sewage hitherto known are designed to include the use of aeration and/or agitation means during the aerobic stage of the treatment for the purpose of reduction of the time required for nitrification. However, the use of such means, in fact, results in the non-uniform distribution of the dissolved oxygen in the treated sewage, which leads to incomplete sewage treatment. Furthermore, simple calculations made by the applicant have shown that, by employing such means, the amount of air per cubic meter of sewage that is supplied thereto is 70–80% more than necessary for the performance of the aerobic activities.

The object of the present invention is to provide a novel combined system for biological treatment of sewage.

SUMMARY OF THE INVENTION

In accordance with one aspect of the present invention there is provided a biological reactor for the treatment of sewage, that is void of any elector-mechanical aeration or agitation means and comprises:

at least one array of successively alternating aerobic and anaerobic compartments having liquid passage therebetween, for, respectively, aerobic and anaerobic degradation of the biodegradable substances in said sewage, each compartment having a bottom, side walls and an open top area defined between said side walls;

each pair of successive aerobic and anaerobic compartments having a common partition wall via which said liquid passage is provided, wherein the liquid passage from an aerobic compartment to its adjacent succeeding anaerobic compartment is provided through a slot at the bottom of their common wall, and the liquid passage from an anaerobic compartment to its adjacent succeeding aerobic compartment is provided by means of gravity-caused liquid flow over their common wall.

According to another aspect of the invention, there is provided a process for biologically treating sewage, wherein said sewage is transferred, by gravitational forces with a substantially constant flow rate (Q), through an array of successively alternating aerobic and anaerobic compartments for, respectively, aerobic and anaerobic degradation of biodegradable substances in said sewage, the compartments being separated by partition walls and each having a top area (S), the passage of said sewage from an aerobic compartment to its adjacent succeeding anaerobic compartment being provided at the bottom of their common partition wall, while the transfer of sewage from an anaerobic compartment to its adjacent aerobic compartment is performed by means of gravity-caused flow over their common partition wall; whereby oxygen required for said aerobic treatment is dissolved into the sewage via the air-sewage interface at the top area of the anaerobic and aerobic compartments forming thereby a dissolution layer, the depth of oxygen dissolution and, consequently, the oxygen concentration in the dissolution layer at the top area of the compartments being defined by the vertical velocity of the liquid within the compartments, calculated as $V=Q/S$.

Within the context of the present invention, an "aerobic compartment" is a compartment wherein the aerobic activities substantially take place, whereas, an "anaerobic compartment" is a compartment wherein the anaerobic activity substantially take place.

The term "dissolution layer" refers, in general, to a surface layer of the liquid characterized by the depth of liquid at which oxygen is dissolved. The depth of the layer may vary, depending on the flow rate of the liquid in the reactor, so that the slower the flow rate, the tinner the dissolution layer and vice versa. Oxygen is dissolves into the liquid via the top area of the aerobic and anaerobic compartments. Thus, the top surface of the whole reactor serves as an air-liquid contact area, from which oxygen is dissolved into the sewage, at a constant oxygen concentration. By utilizing the air-liquid contact area as the only source of oxygen required to perform the treatment, the need for mechanical aerators or air compressors is obviated, which is economically beneficial.

It should be noted that though the reactor of the invention is designed to perform only the biological treatment of sewage it may easily form part of a sewage treatment array, being connected to other sewage treatment facilities, known to the man of the art.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE PREFERRED EMBODIMENTS

Generally, the present invention provides a reactor, and its use, for the biological treatment of sewage. The reactor is comprised of a plurality of successively arranged aerobic and anaerobic compartments having liquid passage therebetween for raw sewage entering the reactor being sequentially transferred through the compartments for its aerobic and anaerobic treatment performed by, respective, aerobic and anaerobic bacteria present in the raw sewage.

Figure 1:
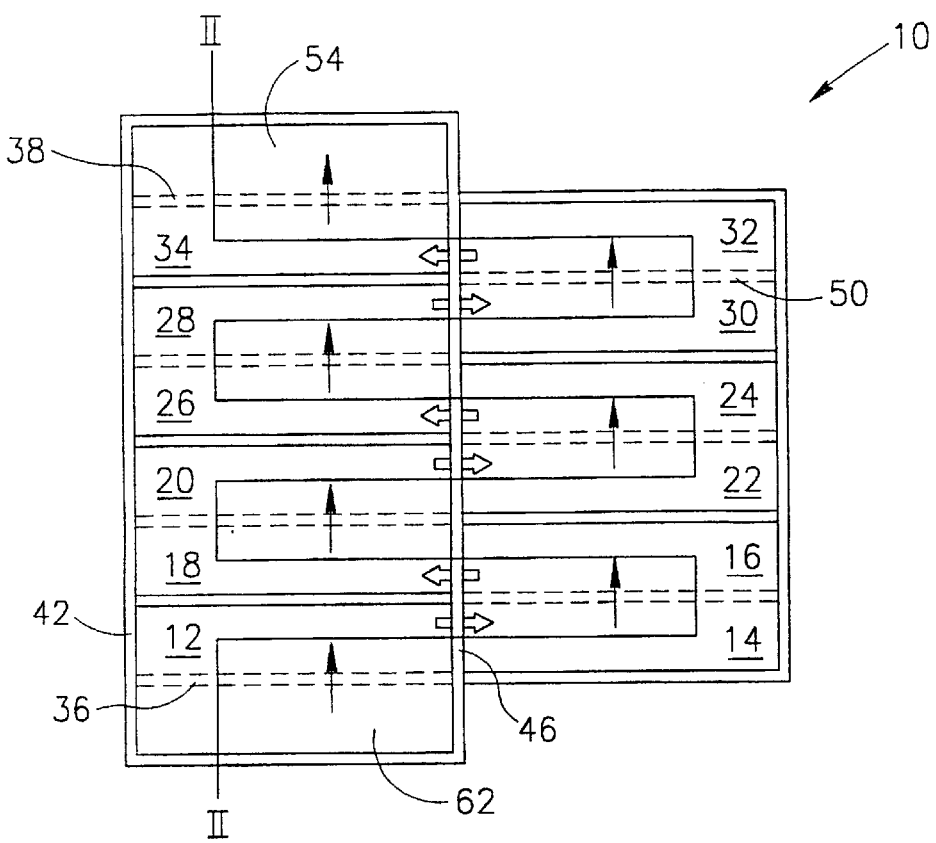
FIG. 1 is a schematic top view of a reactor according to one embodiment of the invention.
Figure 2:
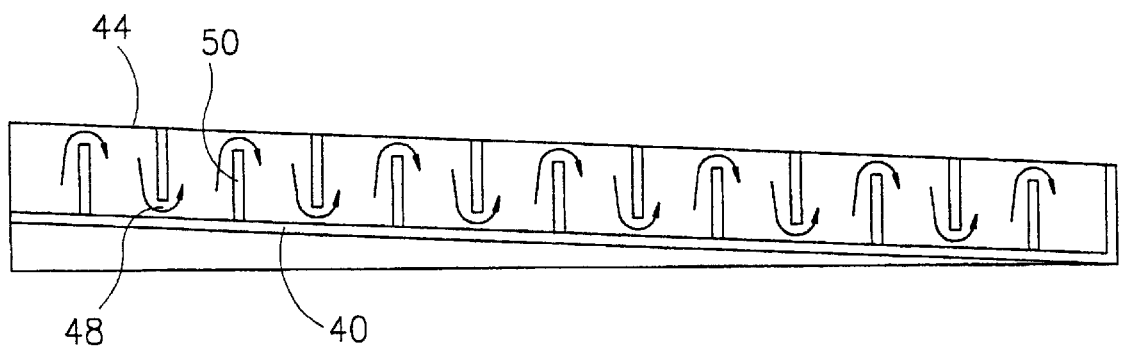
FIG. 2 is a schematic cross-sectional view of the reactor shown in FIG. 1, along line II—II.

FIGS. 1 and 2 illustrates one example of a reactor constructed and operated according to the invention. The reactor 10 includes a succession of alternating aerobic compartments 12, 16, 20, 24, 28 and 32, and anaerobic compartments 14, 18, 22, 26, 30 and 34, arranged in a single file array. The term "single file" means any arrangement of alternating compartments, enabling the liquid to flow from a single aerobic compartment into a single anaerobic compartment and from a single anaerobic compartment into a single aerobic compartment. In a single file arrangement, the compartments may be successively aligned in a single row or in two side-by side rows, being disposed in a chess-like manner. FIG. 1 illustrates one example of the single file arrangement according to the invention, wherein the compartments are aligned in two side-by-side rows.

Each compartment of the reactor has a bottom 40, (FIG. 2) side walls 42 defining the boundaries of the compartment (FIG. 1), and an open top area 44 defined between the side walls (FIGS. 1 and 2). Each pair of successive aerobic and anaerobic compartments has a common side wall 46 functioning as a partition wall therebetween, and designed so as to enable the liquid passage from the aerobic compartments to their adjacent succeeding anaerobic compartments through an opening 48, preferably in the form of a slot formed at the bottom of the common wall 46. Each pair of successive anaerobic and aerobic compartments has a common partition side wall 50, which is lower in height than side walls 42, to enable the liquid passage from the anaerobic compartments to their succeeding aerobic compartments by gravity-caused liquid flow over the common wall, upon the anaerobic compartment being filled to its capacity with sewage.

Figure 3A:
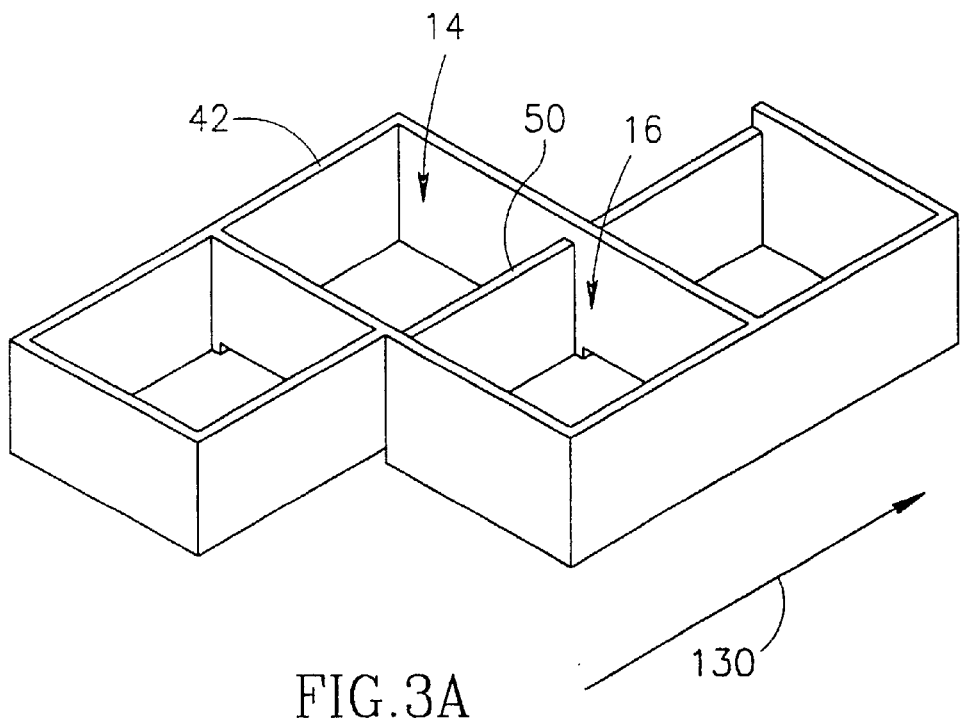
FIGS. 3A and 3B are schematic perspective views of the two examples of the mutual arrangement of aerobic and anaerobic compartments in sewage treatment reactor according to the invention.

FIG. 3A shows a perspective view of a portion of the reactor shown in FIG. 1, wherein common side wall 50 connecting anaerobic compartment 14 with its adjacent succeeding aerobic compartment 16, is lower than side walls 42 of at least anaerobic compartment 14.

As seen in FIG. 2, the compartments of the reactor 10 are arranged so that their bottom walls lie in a plane sloping downwardly in the downstream direction in order to provide gravity-caused liquid flow through this reactor 10.

The reactor 10 may further comprise a distribution channel 52 to which incoming sewage is discharged before the treatment and/or a collection channel 54 to which the treated liquid is transferred at the end of the treatment, the distribution channel and collection channel each having fluid communication with at least one compartment in the reactor 10. Liquid passage between the distribution channel 52 and the aerobic compartment 12 is provided via their common wall 36, constituting an inlet port, in a manner similar to that between anaerobic and their adjacent succeeding aerobic compartments, i.e. in the form of liquid over-flow.

The reactor 10 comprises six pairs of aerobic and anaerobic compartments, however, it should be appreciated that this number of pairs of the compartments may be different. Preferably, there should be no less than four pairs of aerobic and anaerobic compartments in the reactor of the present invention and it should start with an aerobic compartment. The last anaerobic compartment is either connected to the collection channel or serves, by itself, as the collection channel. In the reactor 10, anaerobic compartment 34, which is the last compartment in the succession, is connected to the collection channel 54 so as to enable liquid to pass from compartment 34 to channel 54 by the flow over their common wall 38, constituting thereby the outlet port.

With reference to FIGS. 1 and 2, in operation 10, incoming sewage, being initially discharged into distribution channel 52, enters reactor 10 under a constant flow rate over wall 36, separating distribution channel 52 from the first aerobic compartment 12. The raw sewage then passes, by gravity-caused flow, through the sequence of compartments towards the last compartment 34 and subsequently to the collection channel 54 through their common wall 38. Sewage transfer from each aerobic compartment to its adjacent succeeding anaerobic compartment is provided by means of slot 48, at the bottom of their common wall, whereas, transfer of sewage from each anaerobic compartment to its adjacent succeeding aerobic compartment is provided by flow over their common wall 50. The direction of movement of the fluid in each compartment along reactor 10 is indicated by arrows. Thus, sewage in the aerobic compartments moves in a generally downward direction and in the anaerobic compartments in a generally upward direction.

Figure 3B:
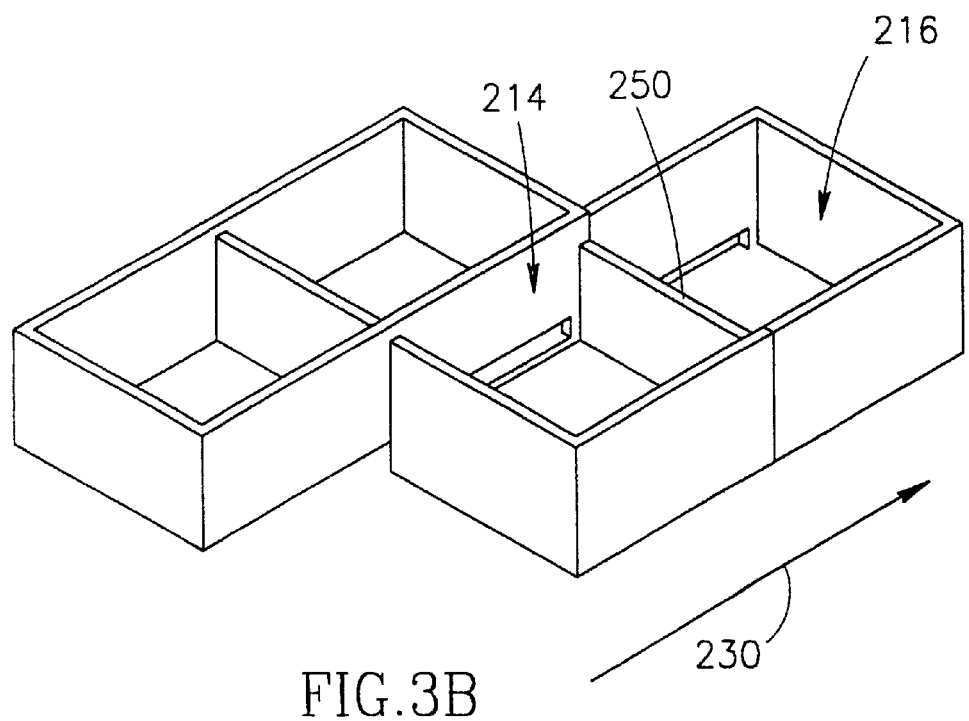

The direction of flow of the sewage from the anaerobic compartments into the aerobic compartments may be either perpendicular to the overall direction of movement of the sewage, designated as arrow 130, in FIG. 3A, or parallel to the overall direction of movement of the sewage in the reactor, or, alternatively as shown in FIG. 3B which illustrates an alternative embodiment of a portion of the reactor according to the present invention. Sewage flowing over wall 250 from anaerobic compartment 214 to its succeeded aerobic compartment 216 moves in the general direction of the movement of the sewage, designated as arrow 230.

The efficiency of the biological treatment of sewage by the reactor of the present invention depends, inter alia, on the oxygen concentration in the dissolution layer, the biological processes duration and the flow rate of sewage within the reactor.

Oxygen is dissolved into the liquid via the air-liquid interface at the top area of the aerobic and anaerobic compartments, thereby forming a liquid "dissolution layer". Due to the liquid flow in the reactor, the dissolution layer slides from each anaerobic compartment into its succeeding aerobic compartment, while already containing a substantial amount of dissolved oxygen. Additional oxygen is then dissolved into the dissolution layer at the top area of the aerobic compartments. Thus, actually, the entire top surface of the reactor constitutes the air-liquid contact.

The flow of sewage moving downwardly through the aerobic compartments and entering the anaerobic compartments is sufficiently slow to enable the dissolved oxygen to be gradually consumed at the aerobic compartment by the active aerobic bacteria.

Figure 4:
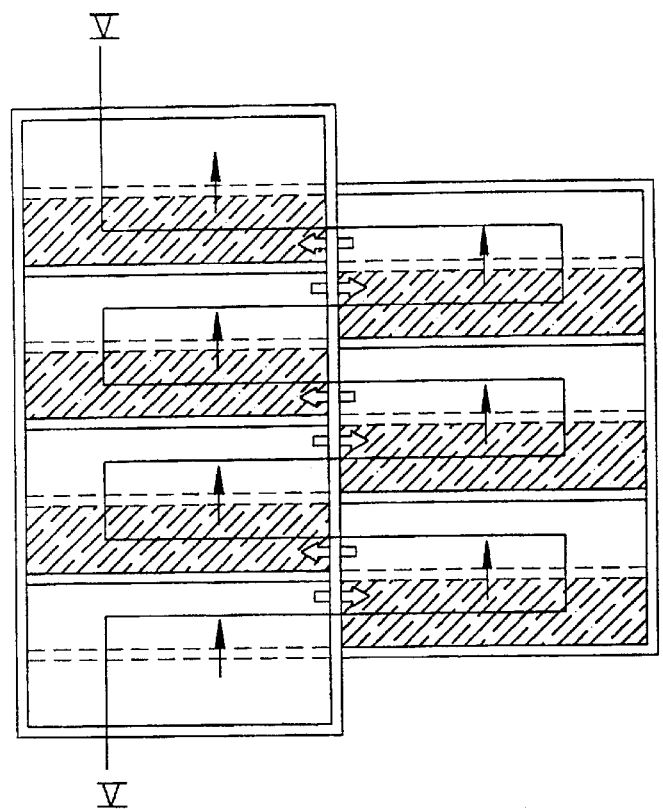
FIG. 4 is a schematic top view of the reactor of FIG. 1, when in operation.
Figure 5:
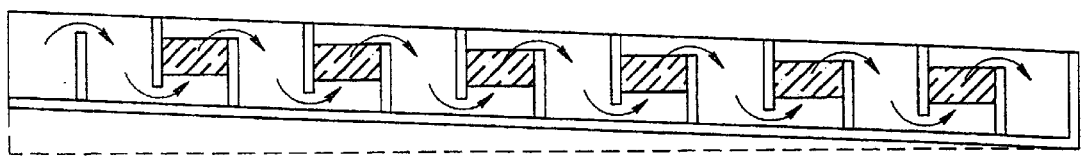
FIG. 5 is a schematic cross-sectional view of the reactor shown in FIG. 4, along line V—V, in which areas of the aerobic process are blank, and areas of the anaerobic process are dashed.

FIGS. 4 and 5 illustrate, in particular, the aerobic zones (wherein aerobic activities occur) shown in blank and anaerobic zones (wherein anaerobic activity occurs) shown in dashed lines, within the aerobic compartments 12, 16, 20, 24, 28 and 32, and anaerobic compartments 14, 18, 22, 26, 30 and 34 of the reactor of FIG. 1. The extension of the aerobic and anaerobic zones within the compartments depends on the duration of the aerobic and anaerobic activities taking place during the biological treatment. The duration of the nitrification process is normally known to be longer than the duration of the B.O.D. reduction, both forming part of the aerobic stage, and is longer than the duration of denitrification process in the anaerobic stage. In order to perform the biological treatment to completeness, it is therefore preferable that the aerobic zones occupy the entire aerobic compartments and the upstream parts of anaerobic compartments and the anaerobic zones occupy only the downstream part of the anaerobic compartments.

The total time duration of the overall treatment according to the invention is dependent of the duration (residence time) of nitrification in the aerobic phase and on that of denitrification, in the anaerobic phase. In principal, the total process duration of the treatment is preferably not less than the sum of the duration of the nitrification process and the duration of the denitrification process, wherein for n pairs of compartments, the process will be divided such that in each pair of compartments, 1/nth of the process should take place. Typically, at 15° C., the residence time required for nitrification is 9.6 hours, and the residence time required for denitrification is 4.3 hours [G. Tchobanglous & F. L. Burton Metcalf & Eddy Inc. Wastewater engineering treatment, disposal & reuse. McGraw-Hill Inc. p. 715 (1991)]. The total duration of the treatment process, in this specific case, will then be preferably not less than 13.9 hours. Thus, to ensure the completion of the process, the reactor should preferably operate continuously for a minimum of 14 hours.

The flow rate Q should be constant in order to obtain the substantially constant oxygen concentration in the dissolution layer at the top area of each compartment. The value of the oxygen concentration is defined by the vertical velocity of the liquid within each compartment, calculated as $V=Q/S$ where S is the area of the compartment at its top 44. The flow rate and the area are chosen so as to obtain the required oxygen concentration, being preferably not more than 3 mg/liter.

With the design of the reactor of the present invention, it enables the determination of the compartment's size, sewage flow rate and, consequently, oxygen dissolution demands required for operation of the facility at a given temperature and for the treatment of a given volume of sewage per unit time. Thus, for example, if it is desired to treat 1200 m$^3$ of sewage per hour, and it is known that at the temperature at which the sewage will be treated it will take 14 hours to complete the slowest bacteriological process of this amount of sewage, the reactor depicted in FIG. 1A would have to accommodate 1200 m$^3$/h×14h=16800 m$^3$ of sewage. One can then determine the oxygen dissolution requirements to enable all aerobic bacteriological processes to run to completion. Preferably, when deciding on the dimensions of the reactor to be built, extremes of parameters and conditions should be considered.

The liquid flow in the reactor may be described as a vertical movement of its thin layers, their horizontal flow at the top area of each aerobic compartment and their overflow to and dispersion at the top area of the succeeding aerobic compartment. Since the velocity of these layers is greater than the velocity of sludge sedimentation in the compartments, the sludge is swept by the liquid, which prevents the formation of sludge sedimentation at the bottom of the compartments, and thereby obviates the need for artificial mixing means, which is an additional advantage of the present invention.

The reactor of the present invention is not restricted to the single-file design shown in FIG. 1, where each row of compartments comprises only one pair of compartments. The reactor of the present invention may have a double-, triple- or multiple-file arrangement where each row comprises respectively, two, three or more pairs of compartments. In addition, while the reactor described with reference to FIG. 1 contains 6 pairs of compartments, typically the reactor of the invention should consist of 8–12 pairs of compartments.

Figure 6:
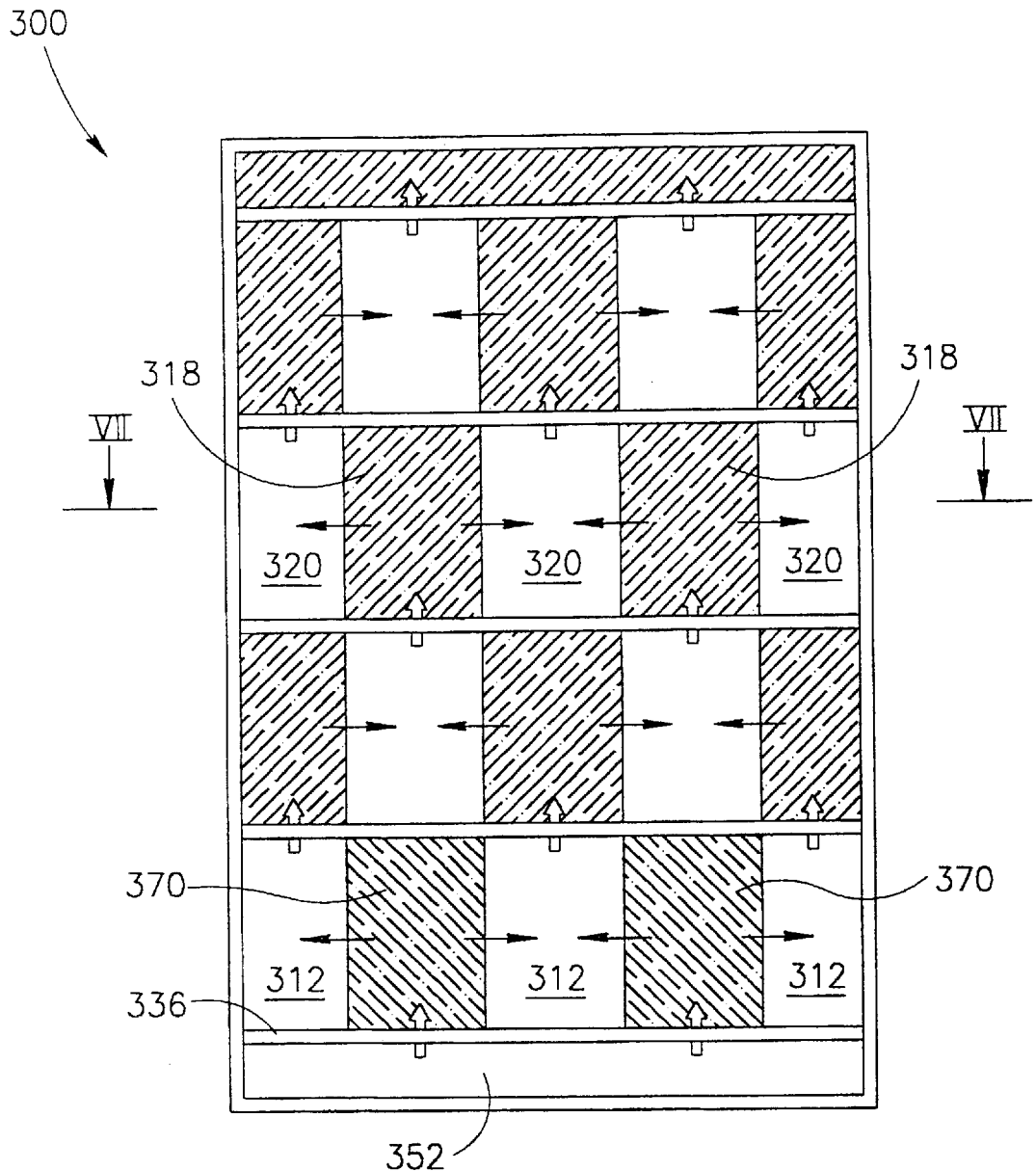
FIG. 6 is a schematic top view of a reactor according to a further embodiment of the invention, when in operation.

FIG. 6 illustrates the construction and operation of a double-file reactor 300 which comprises a two-directional array of 8 pairs of compartments arranged in two successions, each comprising central compartments having full size and compartments having half the size of the central compartments. Sewage is overflowing from each central anaerobic compartment into two adjacent aerobic compartments. Within the reactor, sewage flows between the compartments in the same manner as described in connection with FIGS. 1 and 2, mutatis mutandis.

The reactor 300 further comprises initial compartments 370 having fluid passage from distribution channel 352, to which the raw sewage is discharged, via inlet port 336. The flow of liquid in the initial compartments is generally in an upward direction. The construction of the reactor to have a plurality of initial compartments 370 receiving sewage from one mutual liquid discharge distribution channel 352, such as that illustrated in FIG. 6, ensures that the sewage liquid is processed within different flows with the same constant rate.

Liquid flow from distribution channel 352 into initial compartments 370 is provided in a manner similar to that between an aerobic compartment and anaerobic compartment, i.e. through a slot at the bottom of their common wall, and it enters the reactor by sliding over the common walls between the initial compartments 370 and the first aerobic compartments 312 in each succession of compartments. The flow of liquid within the reactor 300 is represented by arrows.

Figure 7:
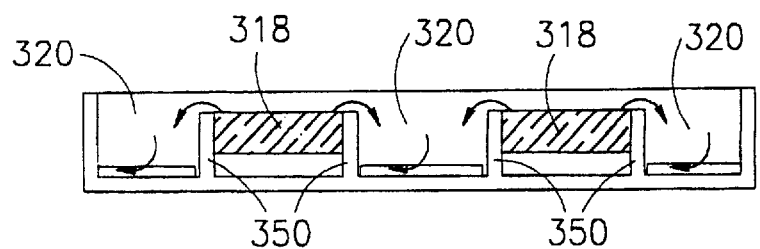
FIG. 7 is a schematic cross-sectional view of the reactor shown in FIG. 6, along line VII—VII.

FIG. 7 schematically illustrates a cross-sectional view of the reactor depicted in FIG. 6 along line VII—VII, which shows the flow of liquid from a single anaerobic compartment 318 into two adjacent aerobic compartments 320, over their common partition walls 350.

Figure 8:
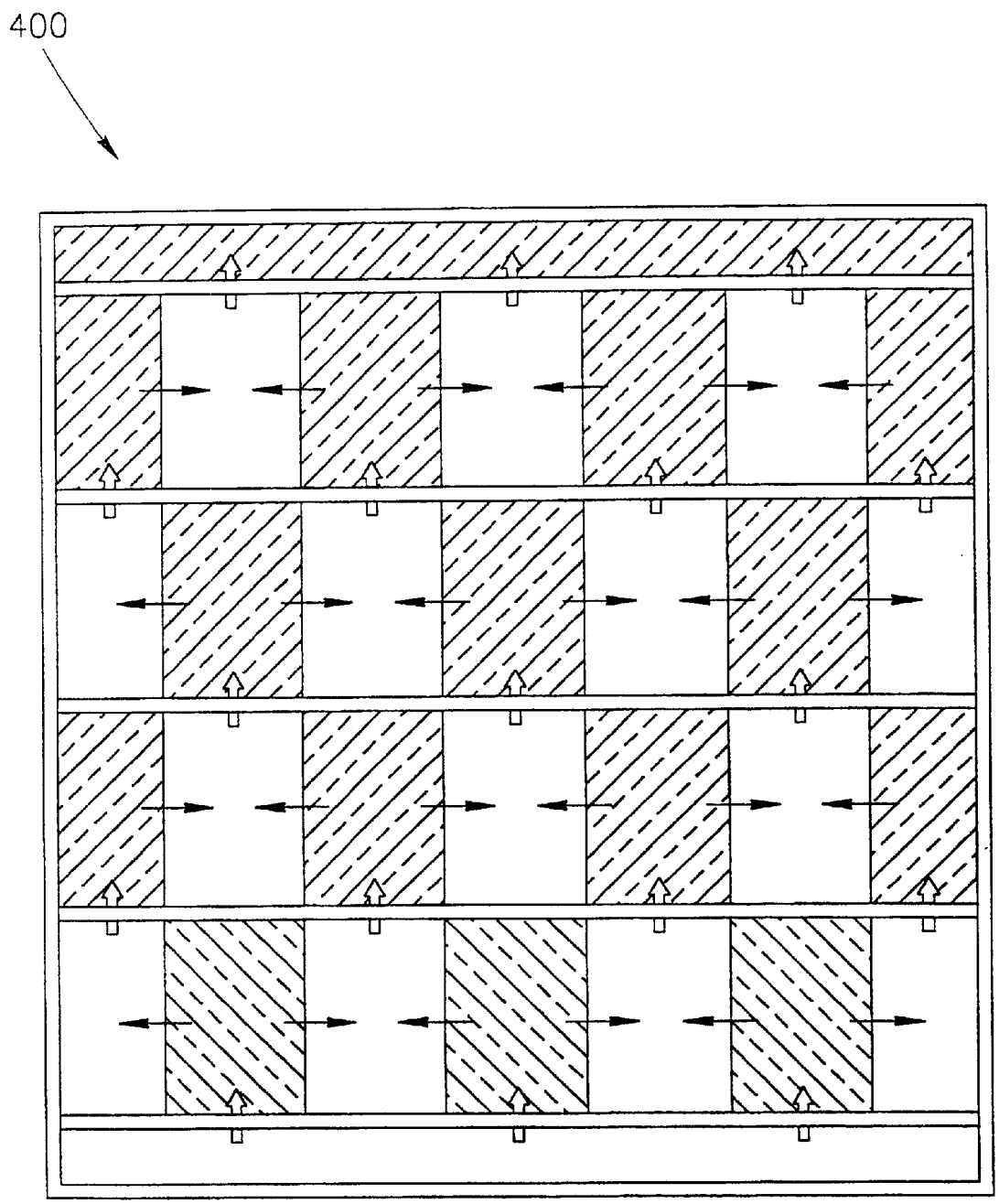
FIG. 8 is a schematic top view of a reactor according to yet a further embodiment of the invention when in operation.

An example of a triple-file arrangement, which is in accordance with a further preferred embodiment of the invention, is schematically illustrated in FIG. 8. The operation of reactor 400 is similar to that of reactor 300, except that each row of compartments contains tree pairs of complete compartments (the two half sized compartments being considered as one complete compartment).

Sewage treatment reactors constructed and operated in accordance with the present invention may be made of any suitable materials. For example, the entire reactor may be made of reinforced concrete cast in place. However, the walls through which the sewage flows when it flows from aerobic to anaerobic compartments, may be made of pre-cast concrete or corrugated sheets of polyvinylchloride.

Further, the compartments within the reactor of the present invention are preferably of polygonal shape, and more preferably square or rectangle compartments of equal dimensions.

The overall downward flow of sewage fluid in the reactor of the present invention may be also obtained in different manners that enable the flow of sewage through the reactor to be generated by the gravity forces. Thus, as shown in FIG. 2, the compartments may be arranged so that their bottoms lie in a generally downwardly sloped plane. Another example is the arrangement of compartments in a series of downward-leading steps.

The compartments and their walls may also be of any suitable design. For example, with reference to FIG. 9A, a thin layer of liquid over-flowing from an anaerobic compartment 514 to its adjacent succeeding aerobic compartment 516 may be obtained by the special design of the upper surface 502 of their common wall 550 over which liquid flows. According to this embodiment, the upper surface 502 of wall 550 slopes downwardly from anaerobic compartment 514 towards the aerobic compartment 516.

Figure 9A:
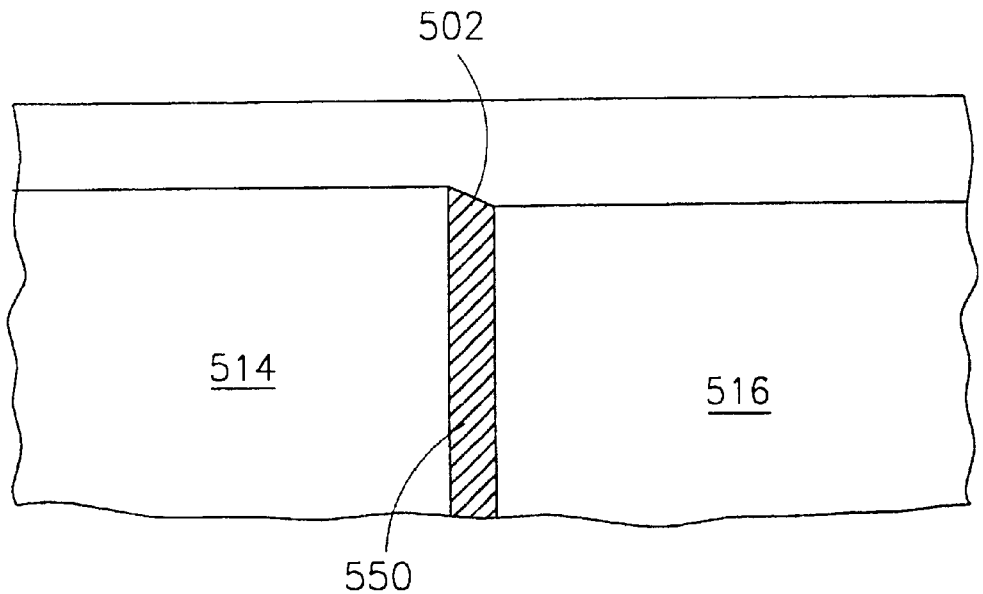
FIGS. 9A–9B schematically illustrate an example of the design of a partition wall between an anaerobic compartment and its adjacent succeeding aerobic compartment in a reactor according to the present invention.
Figure 9B:
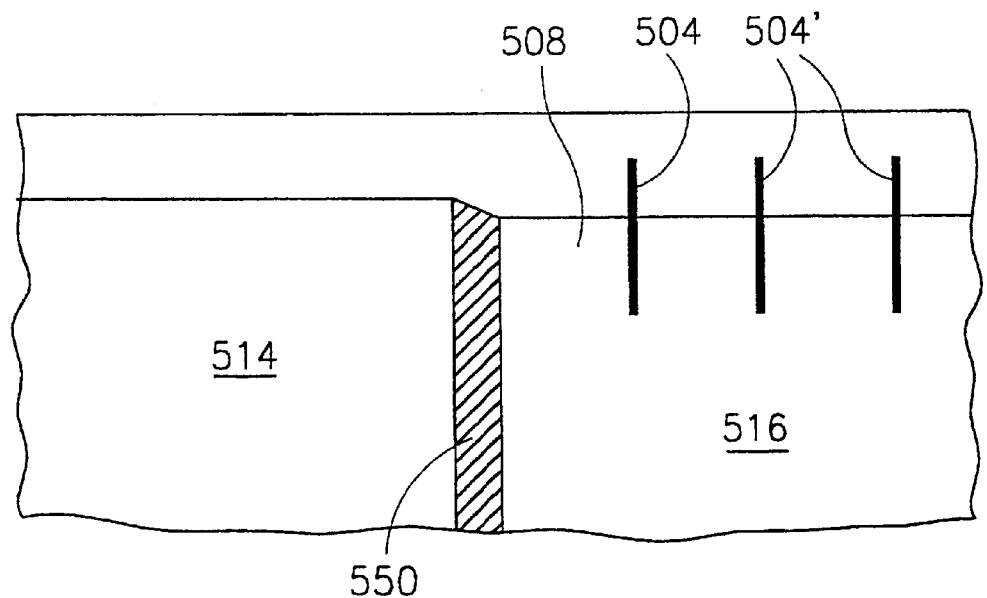

Optionally, with reference to FIGS. 9A and 9B, the aerobic compartment may contain at the top area thereof, at least one vertical plate 504 adjacent and parallel to the common wall 550, the vertical plate extending between opposite side walls of the compartment, that are perpendicular to the common wall 550 (not shown). Incoming liquid will thus flow into the aerobic compartment 516 through a passageway 508 formed between common wall 550 and vertical plate 504, rendering the liquid flow more calm. The compartment may comprise additional vertical plates 504', the plates being spaced from each other.

However, it will be appreciated that the upper surface of the common wall between an anaerobic compartment and its adjacent succeeding aerobic compartment may have other such as planar.

The constant flow rate of the sewage in the reactor is controlled and is preferably adjusted to the average flow rate of sewage produced 24 hours a day. It will be appreciated that sewage is produced more pronouncedly during day time and less during night time. Therefore, excess of sewage produced during the "tide" hours may be collected in a storage chamber and reloaded into the reactor at a later stage, e.g. during "depression" hours.

Figure 10:
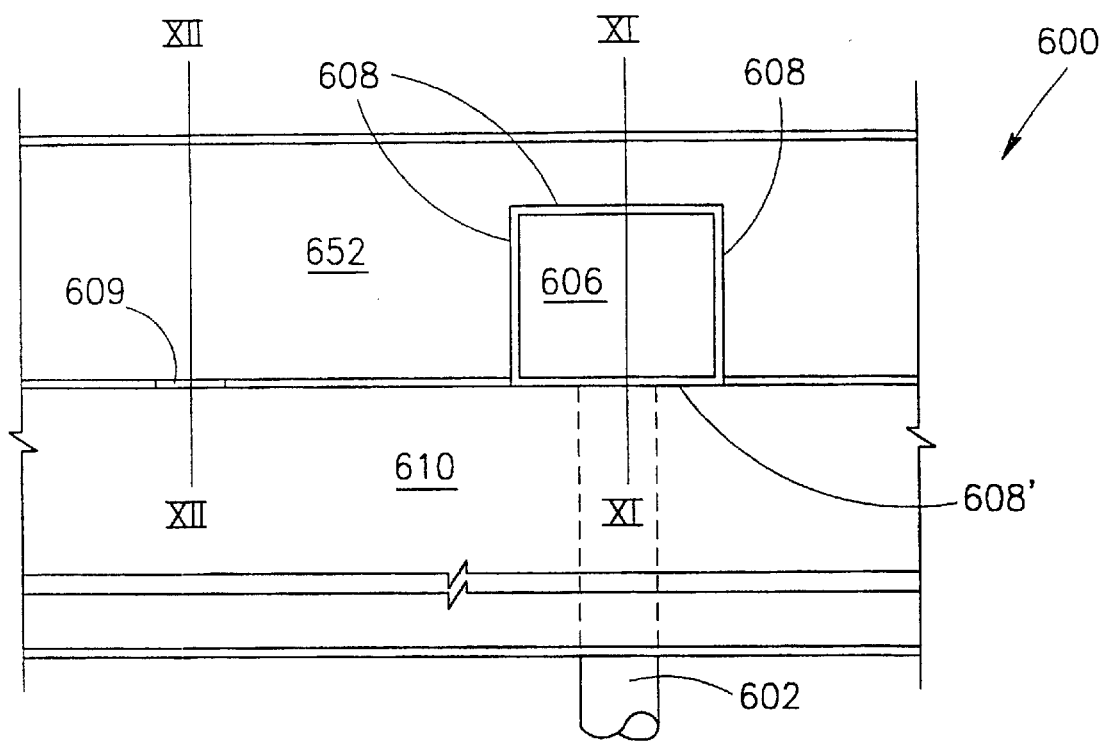
FIG. 10 is a schematic top view of a distribution and storage chamber for possible use with a reactor according to the present invention.
Figure 11:
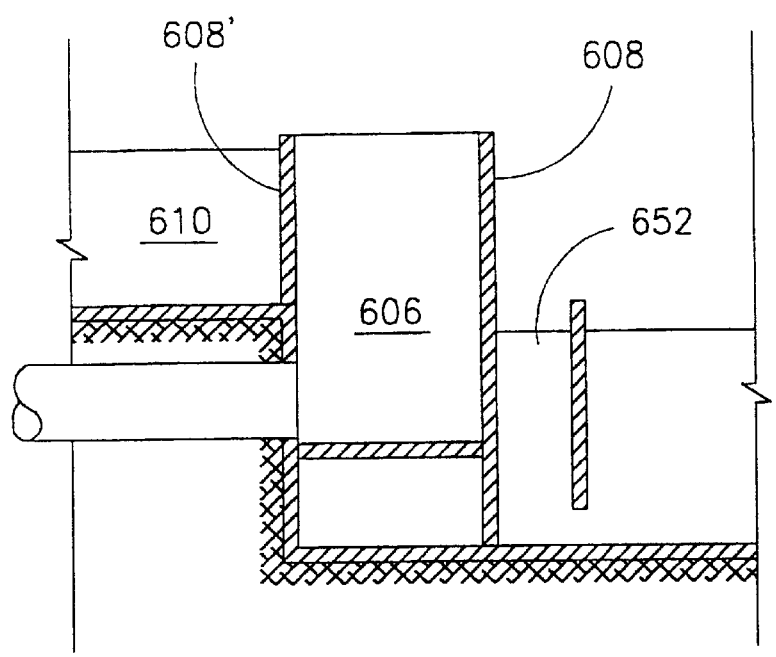
FIG. 11 is a schematic cross-sectional view of the distribution and storage chamber depicted in FIG. 10, along line XI—XI.
Figure 12:
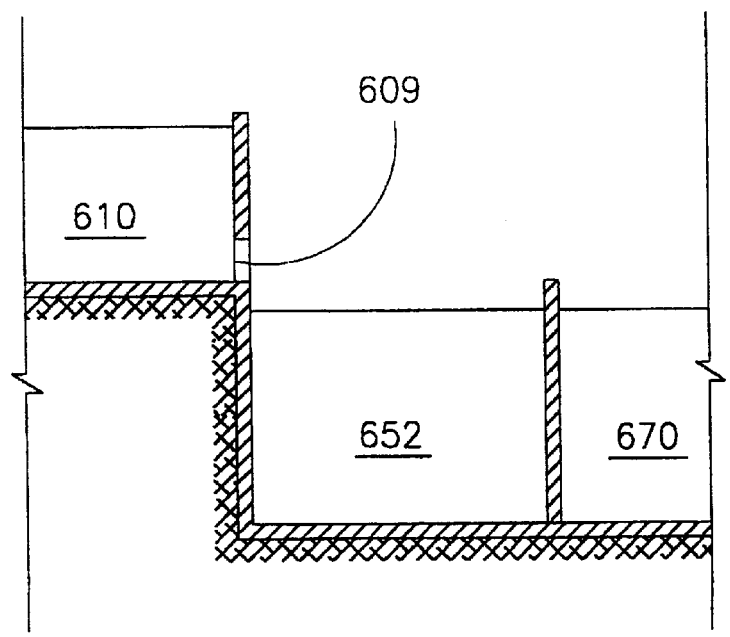
FIG. 12 is a schematic cross-sectional view of the distribution and storage chamber depicted in FIG. 10, along line XII—XII.

An example of a system which enables storage and, when necessary, reloading of raw sewage into a reactor of the invention, is depicted in FIGS. 10–12. Distribution and storage system 600 consists of a regulating chamber 606 connected via a pipe 602 with a source of raw sewage, a distribution channel 652 and a storage tank 610. Both the distribution channel 652 and the storage tank 610 are capable of receiving raw sewage from regulation chamber 606 by means of the flow of the sewage over the regulation chamber's side walls. Also the distribution channel 652 has a separate fluid inlet 609 from the storage tank 610. Regulating chamber 606 has means for directing the flow of sewage into the storage tank when necessary. One possible example of such means is a weir 608', which may be lowered or raised depending on the level of sewage within the system 600. Thus, during day time, when sewage is produced in a rate greater than the average daily rate, the height of weir 608' will be the same as that of the side walls of the chamber common with the distribution channel 652. As a result, sewage entering regulating chamber 606 will accumulate in the chamber until it overflows both into distribution channel 652 and storage tank 610, via their respective common walls 608 and 608'. When the amount of the sewage from the source is decreased but still sufficient for the reactor to operate at a desired constant rate, the flow to the storage tank 610 is terminated. When the amount of sewage from the source is not sufficient, the sewage is directed to the distribution channel 652 from the storage tank 610 via the inlet 609 (FIG. 12). This inlet may be in the form of a weir, which may be lowered or raised to form a slot at the bottom thereof through which raw sewage may flow from the storage tank 610 into the distribution channel, 652.

From the distribution channel 652, sewage may be transferred into the reactor as described above with reference to FIGS. 1 and 2 or via at least one initial compartment 670 as described in connection with FIG. 6.

It will appreciated, that the above description of the storage system is one non limiting example, which may be replaced by any other suitable device, enabling storage of the excess of sewage and, when necessary, transfer thereof into the reactor, for example, by pumping.

While the foregoing description describes in detail only a few specific embodiments of the invention, it will be understood by those skilled in the art that the invention is not limited thereto and that other variations in form and details may be possible without departing from the scope and spirit of the invention herein disclosed and defined by the claims which form a part of the present disclosure.

What is claimed is:

1. A biological reactor for treating sewage, said reactor being void of any artificial aeration or agitation means and comprising:
   (a) at least one array of successive aerobic and anaerobic compartments having liquid passage therebetween for, respectively, aerobic and anaerobic degradation of biodegradable substances in said sewage, each compartment having a bottom, side walls and an open top area between said side walls;
   (b) each pair of successive aerobic and anaerobic compartments having a common partition wall via which said liquid passage is provided, wherein
      i) the liquid passage from an aerobic compartment to its adjacent succeeding anaerobic compartment is provided through a slot at the bottom of their common wall; and
      ii) the liquid passage from an anaerobic compartment to its adjacent succeeding aerobic compartment is provided by means of gravity-caused liquid flow over their common wall.

2. The reactor of claim 1, comprising at least four pairs of aerobic and anaerobic compartments, arranged in an alternating manner.

3. The reactor of claim 1, wherein said array of aerobic and anaerobic compartments is in the form of a single file arrangement.

4. The reactor of claim 1, wherein said array of aerobic and anaerobic compartments is in the form of a multiple file arrangement.

5. The reactor of claim 1, wherein each aerobic compartment is displaced from its adjacent preceding anaerobic compartment in a step-like arrangement, to enable said gravity-caused liquid flow therebetween.

6. The reactor of claim 1, having a staggered-row arrangement of the compartments therein, to enable said gravity-caused liquid flow therebetween.

7. The reactor of claim 1, wherein the first compartment in each array is an aerobic compartment.

8. The reactor of claim 1, wherein said common wall between an anaerobic compartment and its adjacent succeeding aerobic compartment has a top surface inclined downwardly from the anaerobic compartment towards the aerobic compartment.

9. The reactor of claim 1, comprising between 8 to 12 pairs of compartments.

10. The reactor of claim 9, further comprising a distribution channel having fluid passage to the array of compartments.

11. The reactor of claim 10, further comprising a storage tank having liquid passage to said distribution channel.

12. The reactor of claim 11, further comprising a regulating chamber having a bottom and side walls and an open top area, said regulating chamber having liquid passage to the distribution channel and to the storage tank by means of liquid flow over the regulating chambers respective side walls, wherein at least one side wall thereof functions as a weir.

13. The reactor of claim 11, wherein said storage tank and said distribution channel have a common wall therebetween functioning as a weir through which liquid passage from said storage tank to said distribution tank is provided.

14. The reactor of claim 1, further comprising a collection channel and having fluid passage from the last compartment of said at least one array to said collection channel.

15. A process for biologically treating sewage, wherein said sewage is transferred, by gravitational forces with a substantially a constant flow rate (Q), through an array of successively alternating aerobic and anaerobic compartments for, respectively, aerobic and anaerobic degradation of biodegradable substances in said sewage, the compartments being separated by partition walls and each having a top area (S), the passage of said sewage from an aerobic compartment to its adjacent succeeding anaerobic compartment being provided at the bottom of their common partition wall, while the transfer of sewage from an anaerobic compartment to its adjacent aerobic compartment is performed by means of gravity-caused flow over their common partition wall; whereby oxygen required for said aerobic treatment is dissolved into the sewage via an air-sewage interface at the top area of the anaerobic and aerobic compartments forming thereby a dissolution layer, the depth of oxygen dissolution and, consequently, the oxygen concentration in the dissolution layer at the top area of the compartments being defined by the vertical velocity of the liquid within the compartments calculates as $V=Q/S$.

16. The process of claim 15, having a constant oxygen concentration at the dissolution layer.

17. The process of claim 15, wherein the sewage flow in the aerobic compartment is in the downward direction while the sewage flow in the anaerobic compartment is in the upward direction.

18. The process of claim 15, wherein the oxygen is dissolved in the dissolution layer at the top area of both aerobic and anaerobic compartments.

19. The process of claim 15, being a substantially continuous process.

20. The process claim 15, wherein the aerobic degradation of the biodegradable substance comprises more than one aerobic activity, the total duration of the process is not less than the sum of the duration of the longest among the aerobic activities and the duration of the anaerobic activity.

21. The process of claim 15, wherein said sewage is transferred through between 8 to 12 pairs of aerobic and anaerobic compartment.

22. The process of claim 15, lasting up to 24 hours a day.

\* \* \* \* \*